March 24, 1959 K. STAIGER 2,879,084
SEALED COUPLING FOR RADIALLY AND ANGULARLY MISALIGNED DUCTS
Filed April 29, 1955 3 Sheets-Sheet 3
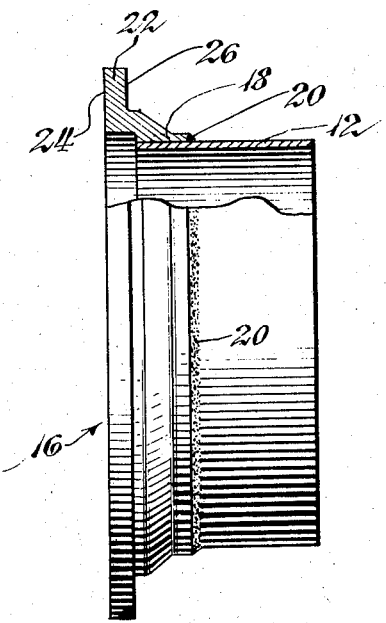
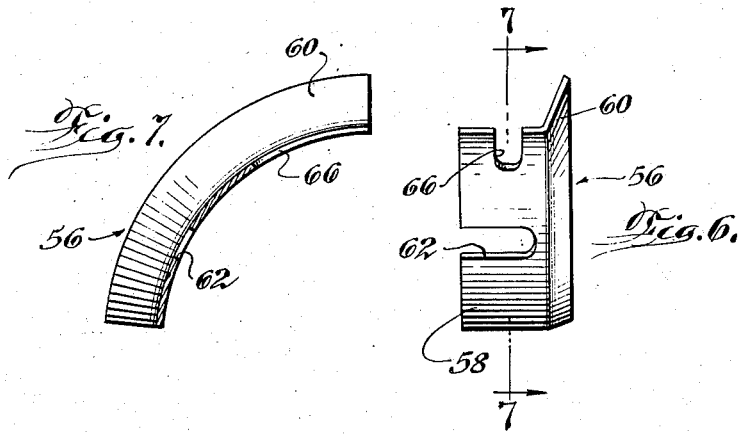

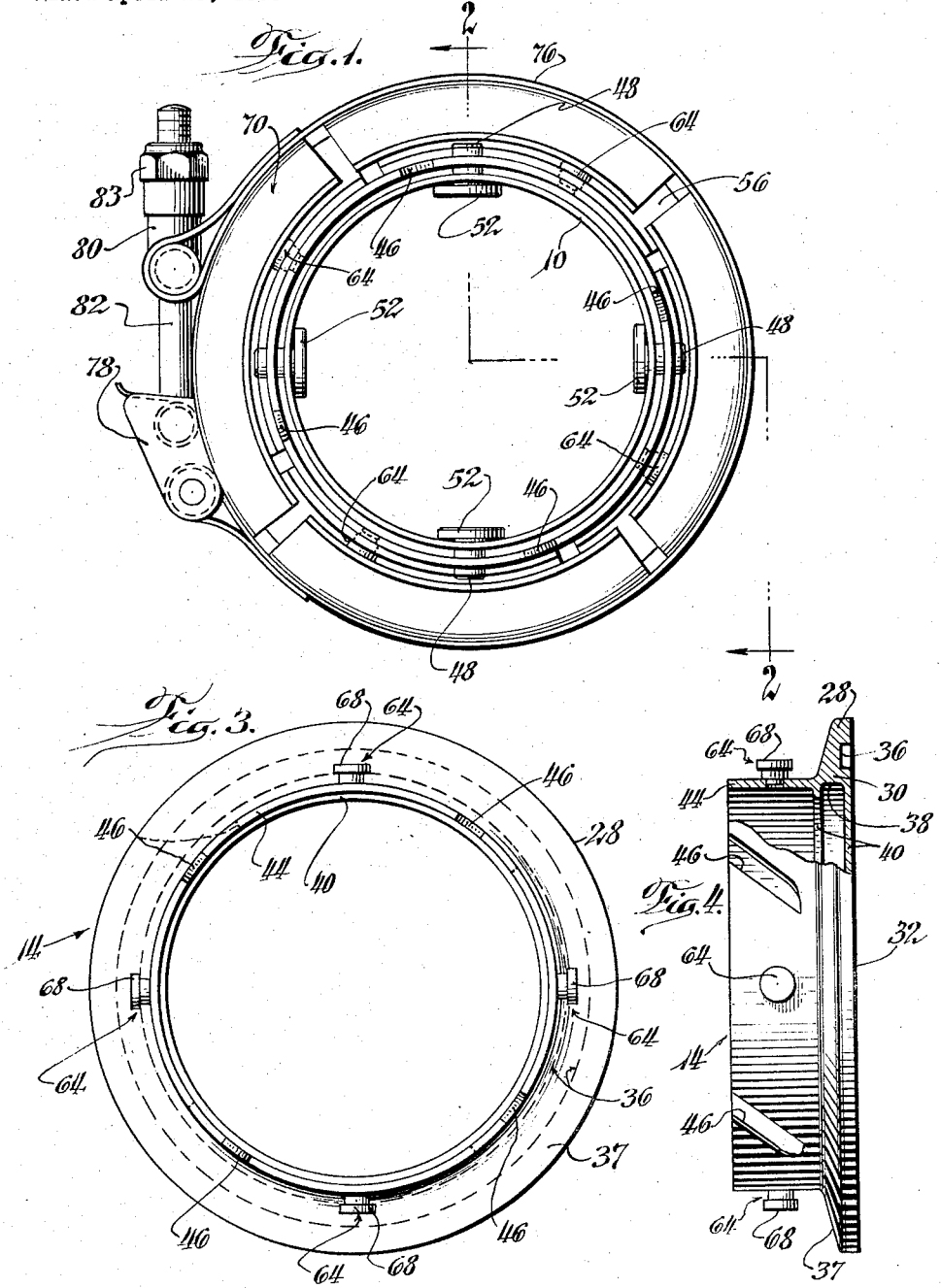

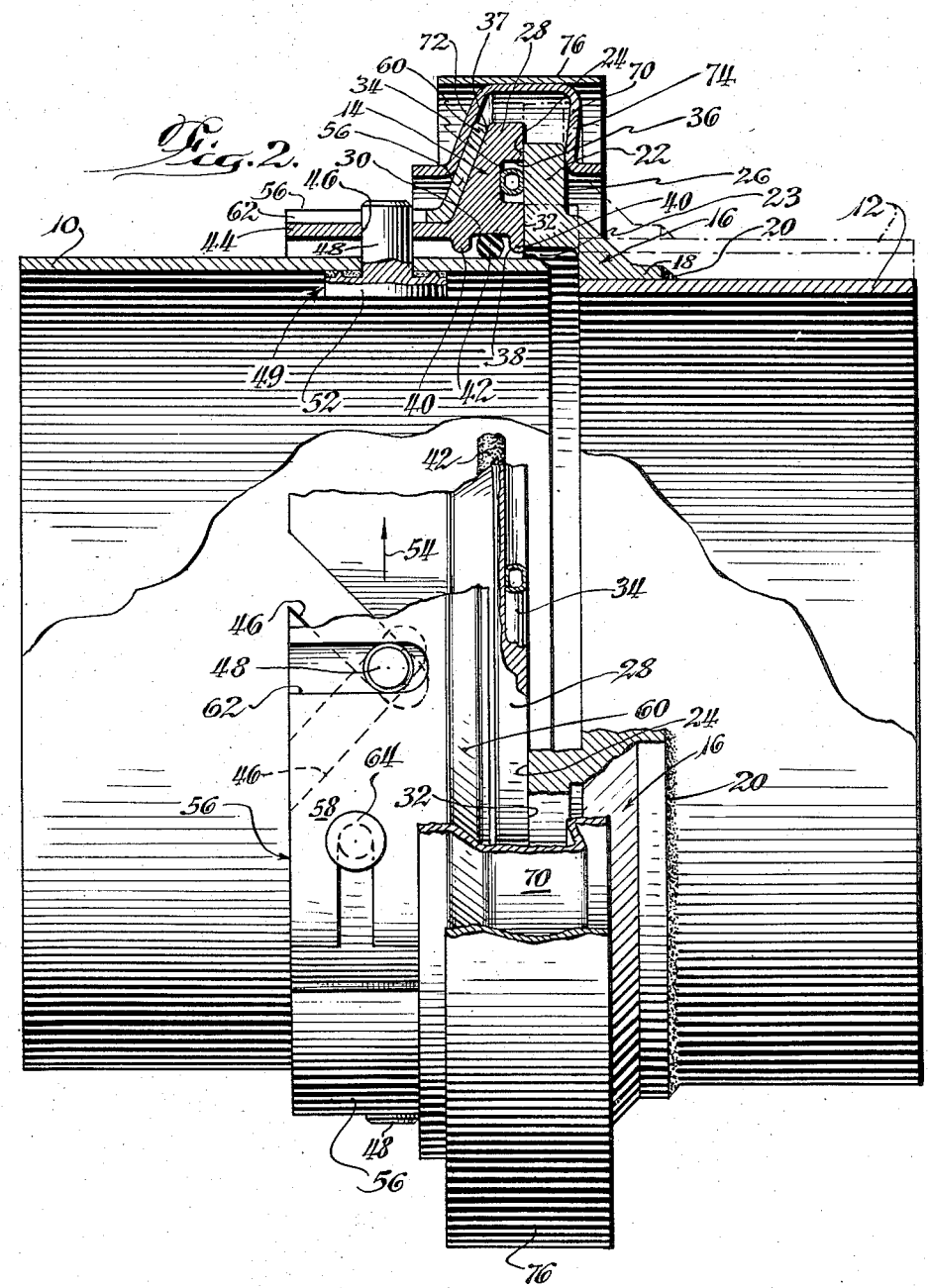

United States Patent Office 2,879,084
Patented Mar. 24, 1959

2,879,084

SEALED COUPLING FOR RADIALLY AND ANGULARLY MISALIGNED DUCTS

Kurt Staiger, Indianapolis, Ind., assignor to Stewart-Warner Corporation, Chicago, Ill., a corporation of Virginia Application April 29, 1955, Serial No. 504,759

8 Claims. (Cl. 285—165)

The present invention is directed to the problem of separably coupling together in a fluid-tight manner the adjacent ends of coacting duct members subject to axial, radial and angular misalignment relative to each other. An unusually difficult problem of this character, which is the special concern of the invention, is that of effecting a leak-proof, separable coupling between duct members leading to the high pressure sides of heat exchangers in aircraft installations which do not hold the duct members rigidly in fixed relation to each other.

One object of the invention is to provide improved coupling means for effecting a high pressure sealed connection between the adjacent ends of duct members even though they are misaligned radially, axially, or angularly relative to each other.

A further object is to provide an improved duct coupling of the character recited in the previous object which is capable of holding the coupled duct members firmly in fixed relation to each other. A related object is to provide an improved duct coupling of this character, which effects a fixed, sealed coupling between the duct members upon tightening of the single clamp.

Other objects and advantages will become apparent from the following description of the form of the invention illustrated in the drawings, in which:

Figure 1 is an end view of a duct coupling embodying the invention;

Fig. 2 is a partially sectioned longitudinal view taken generally along the line 2—2 of Fig. 1;

Fig. 3 is an end view of an annular connector used in the coupling;

Fig. 4 is a partially sectioned side view of the connector of Fig. 3;

Fig. 5 is a partially sectioned side view of another connector of the coupling;

Fig. 6 is a side view of an anchor segment used in the coupling; and

Fig. 7 is a sectional view of the anchor segment taken along the line 7—7 of Fig. 6.

Referring more particularly to Figs. 1 and 2 of the drawings, the separable coupling embodying the illustrated form of the invention is used to effect a fluid-tight, rigid connection between the adjacent ends of two high pressure duct members 10, 12, such as might be used in an aircraft installation to connect the high pressure sides of conventional heat exchangers (not shown), supplied with bleed air from the propulsion engines of the craft. An aircraft installation of this character, apart from coupling between the duct members 10 and 12, ordinarily does not fix rigidly the position of the duct members in relation to each other.

Hence the duct members 10, 12, except as restrained by the connecting coupling, are free to "work" or move somewhat in relation to each other. Moreover, there is ordinarily a certain degree of misalignment between the adjacent ends of the duct members. The axial spacing between the adjacent ends of the two duct members may vary in different installations. Also, the axis of one duct member may be radially displaced or turned at an undetermined angle in relation to the axis of the other duct element. In brief, there may be axial, radial, and/or angular misalignment between the two duct members 10 and 12.

The possible existence of such misalignment between the duct members and the tendency they have to "work" relative to each other complicate the problem of separately coupling the duct members together in a sealed, fluid-tight manner. The seal between the duct members connecting heat exchangers in some aircraft installations must be capable of containing pressures of the order of two hundred and fifty to four hundred pounds per square inch gauge.

Structurally, the improved duct coupling provided by the present invention comprises, Fig. 2, two annular connectors 14, 16 encircling the adjacent ends of the respective duct members 10, 12 in radially adjustable, sealed relation to each other.

The connector 16 has a generally cylindrical skirt portion 18 at one end, Figs. 2 and 5, which is circumferentially fixed and sealed by welding 20 to the duct member 12. A radially extending circumferential flange 22 on the connector 16 is offset axially beyond both the cylindrical skirt portions 18 and the adjacent end of the duct member 12 to encompass the extreme end of the other duct member 10. To allow radial shifting adjustment of the connector 16 in relation to the duct member 10, the inside diameter of the axially offset flange portion 22 is made somewhat greater than the outside diameter of the duct member 10 to provide a substantial radial clearance 23 between the latter and the flange. The duct member 12 and the connector 16 are shown in solid lines, Fig. 2, in one radially displaced position in relation to the duct member 10. Radial displacement of duct 12 and connector 16 in the opposite direction is indicated in phantom. The radial misalignment of the connector 16 can be in any radial direction relative to the duct 10.

The radial side of the flange 22 opposite the duct 12 forms a flat annular bearing surface 24 facing the connector 14. The radial side of the flange 22 opposite the bearing surface 24 forms a flat annular "clamping" surface 26, which coacts in a manner to be presently described in greater detail with clamping components of the coupling.

Even though integral in construction, the connector 14, Figs. 2, 3 and 4, for convenience can be described as comprising a circumferential flange portion 28 extending radially from a cylindrical portion 30 encircling the duct member 10. The connector 14 has a flat annular bearing surface 32 extending radially substantially from the inner end edge of the cylindrical portion 30 to the outer edge of the flange portion 28 in opposing relation to the bearing surface 24 on the connector 16.

A radial seal between the opposed bearing surfaces 32, 24 of the connectors 14 and 16 is formed by an O-ring seal 34 placed in an annular groove 36, Figs. 2 and 4, recessed axially into the surface 32 substantially midway between its inner and outer radial extremities. The cross sectional diameter of the ring structure is somewhat greater than the depth of the groove 36. Hence pressure must be applied to the ring to contain it between the bottom of the groove 36 and the plane of the surface 32.

Preferably the ring 34 is of a conventional, compressible metal construction. Ring seals of this character are readily available commercially and need not be specifically described here.

The side of the connector flange 28 opposite the bearing surface 32 forms a conical, truncated friction surface 37 having an apex of curvature pointing away from the connector 16. The friction surface 37 is engaged by anchoring means to be described later.

The inner periphery of the cylindrical portion 30 of the connector 14 is recessed to define an annular groove 38 open radially inward between two narrow seal retainers 40 remaining at opposite ends of the cylindrical portion. A silicone O-ring seal 42 is fitted into the groove 38. The cross sectional diameter of the seal ring structure is somewhat greater than the radial spacing between the bottom of the groove 38 and the outside cylindrical surface of the duct member 10. Hence, movement of the connector 14 and seal 42 into encircling relation to the duct member compresses the seal to form fluid-tight connection between the duct member and the connector 14.

Except for frictional drag of the seal 42 on the duct member 10, the seal and the connector portion 30 are, as such, freely slidable axially on the duct 10 to allow for free preadjustment of the connector 14 on the duct.

The inside diameter of the two seal retainers 40 at opposite ends of the connector cylindrical portion 30 is somewhat greater than the outside diameter of the encircled duct member 10. Moreover, the overall axial length of the cylindrical portion 30 including the retainers 40 is quite short in relation to the diameter of the duct member. Hence, the connector 14, except for locking structure to be presently explained in detail, can be freely tilted through a limited angle in any direction relative to the axis of the duct 10. The elasticity of the O-ring seal 42 is sufficient to compensate for variations in the radial spacing between the duct 10 and the bottom of the groove 38 produced at different circumferential positions around the duct as an incident to such tilting of the connector on the duct.

The exact degree of axial displacement and angular tilt of the connector 14 on the duct 10 in a given installation is determined by the degrees to which compensation must be made for axial and angular misalignment between the two ducts 10 and 12.

The structure used in fixing the adjusted position of the connector 14 on the duct 10, Figs. 2, 3 and 4, comprises a cylindrical skirt extension 44 integral with and extending axially from the side of the connector cylindrical portion 30 opposite from the bearing surface 32. The inside diameter of the skirt extension 44 is sufficiently larger than the outside diameter of the encircled duct 10 to avoid interference with tilting adjustment of the connector 14 on the duct as previously explained.

The skirt extension 44 defines a circumferentially spaced series, in this instance four, helical open end slots 46, Figs. 2 and 4, beginning near the juncture of the skirt with the cylindrical portion 30.

The slots 46, which are similar to each other in shape and orientation relative to the connector 14, receive respectively the radially projecting shanks 48 of an equal number of pins 49 fixed to the duct segment 10. The shank 48 of each pin projects outwardly through an aperture 50 in the duct 10 from an integral pin head 52 welded to the inner surface of the duct.

By virtue of the helical shaping of the slots 46, rotary displacement of the connector 14 in relation to the duct 10 produces an axial adjustment of the connector on the duct.

The movements of the connector 14 on the duct 10 incident to angular tilting of the connector with respect to the axis of this duct can be explained best with reference to Fig. 2. Clockwise angular adjustment of the connector 14 about a vertical axis as viewed from above in this figure will produce through the reaction of the cam slots 46 on the pin projections 48 a vertical displacement of the connector, as indicated by the arrow 54.

This relationship between the angular and radial displacements of the connector 14 on the encircled duct 10 can be vizualized more clearly when considered conversely. Thus vertical displacement of the connector 14, Fig. 2, would tend to produce a cam action between the marginal edges of the slots 46 and the pin shanks 48 at the vertically central portion of the duct 10. The slot 46 and pin 48 on the side of the duct 10 nearest the viewer (represented by solid lines in Fig. 2) coact to displace the adjacent side of the connector 14 to the left. The corresponding pin 48 and slot 46 (represented by dotted lines in Fig. 2) at the back, vertically central side of the duct 10 coact at the same time to cam the adjacent portion of the connector 14 to the right.

In this manner, opposite sides of the connector 14 are displaced in opposite directions along the axis of the duct 10, as an incident to vertical displacement of the connector 14, with reference to Fig. 2, to produce the previously mentioned clockwise turning or tilting movement of the connector about a vertical axis as viewed from above.

In a similar manner during assembly the connector 14 can be tilted in either direction about either of two perpendicular axes both perpendicular to the axis of the duct segment 10. In effect, the angular tilting of the connector 14 relative to the axis of the duct 10 can be effected about any axis perpendicular to the axis of the duct to compensate for angular misalignment between the two ducts 10 and 12.

The connector 14 is locked in adjusted position on the pin projections 48 by circular anchoring means formed in four similar, yet independent, quadrants or segments 56, Figs. 2, 6 and 7. Each anchoring segment 56 has an arcuate extent of nearly 90 degrees about an axis of curvature coinciding with the axis of the connector 14. Formed from sheet metal, a typical anchoring segment, Figs. 6 and 7, has a cylindrical skirt portion 58 substantially equal in width to the skirt portion 44 of the connector 14 and curved to fit snugly against an underlying segment of the connector skirt, as indicated in Fig. 2. At one arcuate edge the skirt portion 58 of the anchoring segment 56 merges with a conical flange 60, Figs. 6 and 7, shaped to fit snugly against the previously mentioned clamping surface 37 of the connector flange 28, Fig. 2. The convex conical surface of each flange 60, as will be presently described, coacts with clamping structure which also embraces the clamping surface 26 of the connector 16.

An axial slot 62 formed in the medial portion of each anchoring skirt 58, as shown in Figs. 2, 6 and 7, extends from the arcuate edge of the skirt opposite the flange 60 across nearly the full width of the skirt to receive a coacting one of the pin projections 48 fixed to the duct segment 10. In this manner the pin projections 48 hold the respective anchoring segments 52 against rotation around the axis of the duct segment 10.

Axial movement of the anchoring segments 56 on the connector 14 is prevented by an equal number of pins 64 fixed to the connector skirt 44 in equal circumferentially spaced relation to each other and projecting radially outward from the skirt, see Figs. 2, 3 and 4, into arcuate slots 66 formed in one end of the skirt portion 58 of each anchor segment. Upon assembly of the coupling the anchoring sectors 56 are rotated on the connector 14 sufficiently to cause entry of the pins 64 into the slots 66 through the open ends of the slots. The slots 66 are symmetrical with respect to a plane perpendicular to the axis of curvature of the anchoring sectors. Radially beyond the anchoring segments 56 the pins 64 terminate in enlarged heads 68.

It will be observed with reference to Fig. 2 that each anchoring sector slot 62 is oriented at a substantial angle to the underlying connector slot 46 embracing the same pin projection 48 fixed to the duct segment 10. Hence to lock the connector 14 in an adjusted position on the pin projections 48 it is necessary only to hold the anchoring sectors 56 against rotation relative to the connector 14. This is effected by tightening extremely simple clamping means which also binds the connectors 14 and 16 in fixed position relative to each other, thus making a firm connection between the duct segments 10 and 12.

The clamping assembly comprises a series of four arcuate clamping segments 70 mounted substantially end to end around the circumferential connector flanges 22, 28. Formed of sheet metal, each clamping member 70, as shown in Fig. 2, is generally U-shaped in transverse section. A leg 72 on the left hand side, Fig. 2, of each clamping member 70 is shaped as an arcuate segment of a truncated cone to fit slidably against the outer surface of the underlying flanges 60 of the anchoring sectors 56. The series of clamping members 70 and the series of anchoring sectors 56 are circumferentially displaced relative to each other so that each clamping member overlaps two anchoring sectors. Another leg 74 on the right hand side of each clamping member 70 is dished somewhat to the left, Fig. 2, to slidably engage the clamping surface 26 of the connector 16, while at the same time avoiding restrictions on radial preadjustment of the connector 16 relative to the connector 14.

All four clamping members 70 are spot welded to an encircling metal tension band 76, Figs. 1 and 2. Opposite ends of the band 76 form looped connections with two anchoring members 78, 80. A tensioning stem 82 pivoted to the anchor 78 extends through the anchor 80 and is threaded for a clamp tightening nut 83.

In review, the compensation for radial misalignment of the duct segments 10 and 12 is effected upon assembly of the connecting coupling by radial displacement of the connectors 14 and 16 relative to each other.

During assembly the connector 14 is adjusted axially and angularly with respect to the axis of the duct segment 10 to compensate for axial and angular misalignment of the duct segments 10 and 12. Tightening of the single clamping nut 83, Fig. 1, clamps the connectors 14 and 16 together and locks the connector 14 in fixed position on the pin projections 48 to hold the duct segments 10 and 12 against movement relative to each other.

A highly effective, high pressure seal between the connectors 14 and 16 is effected by the seal ring 34, which is compressed upon tightening the clamping nut 83. The O-ring seal 42 forms a tight, high pressure seal between the connector 14 and the duct segment 10; the weld 20 seals the connector 16 to the duct segment 12. This completes a dependable fluid tight connection between ducts 10 and 12.

The coupling is freely separable simply by taking off the clamping nut 83 and removing the clamping assembly.

While I have shown and described a preferred embodiment of my invention, it will be apparent that numerous variations and modifications thereof may be made without departing from the underlying principles and scope of the invention. I therefore desire, by the following claims, to include all such variations and modifications by which substantially the results of my invention may be obtained through the use of substantially the same or equivalent means.

I claim:

1. A coupling assembly for effecting a fixed sealed connection between the adjacent ends of two duct members opposing each other in imperfect alignment, comprising, in combination, a first annular connector adapted to be circumferentially sealed fixedly to one end of a first duct member, a second annular connector adapted to encircle one end of a second duct member, said connectors each defining a flat annular bearing surface thereon facing a similar bearing surface on the other connector, one of said connectors defining an annular groove recessed into the bearing surface thereof and opening toward the bearing surface of the other connector, a resilient annular seal member fitted into said groove and dimensioned to effect a circumferential seal with the opposing bearing surface of said other duct member, said second duct member including a pair of axially spaced seal retainers projecting radially inward to define therebetween a groove opening radially inward, a resilient annular sealing member fitted into said last mentioned groove and having an uncompressed radial thickness of structure exceeding the radial distance between the bottom of said last mentioned groove and the radially inward extremities of said seal retainers; a plurality of at least three radial projections circumferentially spaced from each other in an annular pattern, each of said projections having a duct anchoring base thereon, said second connector having a cylindrical skirt portion thereon defining slots therein adapted to receive said projections, said skirt portion having an enlarged inside diameter to allow free angular tilting adjustment of said second connector, circumferentially sectionalized anchoring means disposed adjacent said second connector in contact therewith and including portions defining slots therein for receiving said radial projections, said slots in said anchoring means being oriented at a substantial angle in relation to the respective slots of said second connector skirt, said slots in said second connector skirt being shaped and positioned relative to the connector to effect tilting and axial adjustment of the second connector in relation to said projections as an incident to radial and rotary displacement of said second connector relative to said projections; and means clamping said anchoring means, said first connector and said second connector tightly together thus locking said first connector in fixed position in relation to said projections.

2. Coupled high pressure duct structure comprising, in combination, first and second duct members having ends thereof opposing each other in imperfect alignment, a first annular connector circumferentially sealed fixedly to said end of said first duct member, a second annular connector encircling said second duct member and including an inner cylindrical portion defining an axial opening therethrough sufficiently large to provide substantial radial clearance around the second duct member, said connectors each having a circumferential radially extending flange thereon and defining a flat annular bearing surface facing in opposed relation a similar bearing surface on the other connector, said cylindrical portion of said second connector defining an annular groove opening radially inward, a compressible annular seal fitted into said groove, the radial dimension of the uncompressed seal itself being larger than the radial spacing between the bottom of said seal groove and the adjacent outer surface of said second duct to form a fluid tight seal with the latter, the length of said second connector cylindrical section being only a small fraction of the diameter of said second duct member thus facilitating a tilting adjustment of the connector relative to the axis of the encircled duct member, one of said connectors defining an annular groove in said bearing surface thereof extending around the axis of the connector and opening axially toward said bearing surface of the other connector, an annular compressible seal disposed in said last mentioned groove and having an uncompressed axial dimension greater than the corresponding depth of said last mentioned groove, said second connector having a cylindrical skirt thereon on the side thereof opposite said bearing face bearing surface thereon, said skirt having an inside diameter substantially greater than the outside diameter of said second duct member, said skirt defining therein a plurality of similar helical-shaped slots opening at one extreme circular edge of the skirt, means fixed to said second duct member and defining a plurality of projections extending radially outward from said second duct into said respective skirt slots, circumferentially sectionalized anchoring means positioned adjacent said second connector and defining a plurality of axial slots receiving said respective projections to hold said anchoring means against rotary movement on said second duct member, said bearing surfaces on said connectors being radially slidable relative to each other to compensate for radial misalignment of said duct members, said second connector being radially adjustable and tiltable on said second duct members, said second connector being tiltable on said second duct member to compensate for angular misalignment of said duct members, said second connector being axially adjustable on said second duct member by rotary displacement of the connector on the duct member to compensate for axial displacement of said duct members relative to each other, and means clamping together said radial flanges of said first and second connector members and said sectionalized anchoring means to hold said duct members in fixed positions relative to each other.

3. A separable duct coupling, comprising, in combination, two ducts each having one end opposing one end of the other duct in an alignment therewith subject to imperfection, a first annular connector rigidly secured to one of said duct ends in encircling relation thereto, a second annular connector encircling the other of said duct ends in radially spaced relation therearound, each of said connectors including an annular abutment facing the abutment of the other connector, said abutments of the two connectors being shaped in relation to each other to make mutual circumferential contact for different positions of radial adjustment of said connectors with respect to each other, a plurality of at least three radial projections rigidly anchored to the other duct end and circumferentially spaced therearound, said second connector having substantial axial length and defining a plurality of at least three similarly shaped axially extending slots receiving said respective projections, a plurality of at least three separate anchor members shaped to fit against said second connector and extend axially therealong past said respective projections, each of said anchor members defining a slot therein receiving the adjacent projection and shaped to extend axially along the second connector at a sharp angle to the adjacent connector slot, and releasable locking means releasably fixing said anchor members in adjusted positions relative to said second connector and releasably fixing said connectors in adjusted position relative to each other.

4. A releasable duct coupling comprising, in combination, a member defining an opening therein, a duct having one end opposing said opening with an alignment subject to imperfection, an annular connector encircling said duct end in radially spaced relation thereto, said connector including a circular abutment shaped for engagement with said member in encircling relation to said opening therein, a plurality of at least three radial projections fixed to said duct end in circumferentially spaced relation therearound, said connector having substantial axial length and defining a plurality of at least three similarly shaped axially extending slots receiving said respective projections, a purality of at least three separate anchor members shaped to fit against said connector and extend axially therealong past said respective projections, each of said anchors defining a slot therein receiving the adjacent projection and shaped to extend axially along the connector at a sharp angle to the adjacent connector slot receiving the coacting projection, and releasable locking means coacting with said connector and said anchor members to releasably fix the latter in adjusted positions on said connector and coacting with said member and said connector to releasably fix the latter in adjusted position relative to said member.

5. A separable duct coupling, comprising, in combination, two ducts each having one end opposing one end of the other duct in an alignment therewith subject to imperfection, a first annular connector rigidly secured to one of said duct ends in encircling relation thereto, a second annular connector encircling the other of said duct ends and having an inner diameter around the latter substantially larger than said other duct end, each of said connectors including an annular abutment facing the abutment of the other connector, said abutments of the two connectors being shaped in relation to each other to make mutual circumferential contact for different positions of radial adjustment of said connectors with respect to each other, a plurality of projections rigidly anchored to said other duct end and circumferentially spaced therearound, at least two of said projections being spaced around said other duct end to define with respect to the center thereof a radial angle substantially less than one hundred eighty degrees, said second connector having substantial axial length and defining a plurality of similarly shaped axially extending slots receiving said respective projections, a plurality of separate anchor members shaped to fit against said second connector and extend axially therealong past said respective projections, each of said anchor members defining a slot therein receiving the adjacent projection and shaped to extend axially along the second connector at a sharp angle to the adjacent connector slot, and releasable locking means releasably fixing said anchor members in adjusted positions relative to said second connector and releasably fixing said connectors in adjusted position relative to each other.

6. A releasable duct coupling for securing a member defining an opening therein to a duct having one end disposed opposite the opening with an alignment subject to imperfection, said coupling comprising, in combination, a connector encircling the duct in radially spaced relation thereto to permit radial and angular displacement of the connector relative to the duct; seals interposed between the connector and member and between the connector and duct; a plurality of projections on the duct circumferentially spaced therearound, including at least two noncoaxial projections; the connector having substantial axial length and defining an equal plurality of slots circumferentially spaced therearound for receiving respective projections; an equal plurality of anchoring elements adjacent the connector, each element having a substantial axial length and defining a slot for receiving a respective duct projection, each anchoring element slot defining a substantial angle with its respective connector slot; and apparatus for clamping the member, the connector, and the elements rigidly together to lock the duct and member in fixed sealing relation to each other.

7. The combination claimed in claim 6 wherein the duct projections comprise four equally spaced radial projections and wherein the connector and the anchoring elements include pin and slot means for securing the connector and elements against relative axial and regular movement.

8. The combination claimed in claim 7 wherein the anchoring elements are disposed around and in engagement with the connector, wherein each anchoring element slot is substantially parallel to the connector axis, and wherein each connector slot defines a substantial acute angle with its respective anchoring element slot.

References Cited in the file of this patent

UNITED STATES PATENTS

| | | |
|---|---|---|
| 919,743 | Mason | Apr. 27, 1909 |
| 1,022,759 | Stine et al. | Apr. 9, 1912 |
| 1,238,218 | Thompson et al. | Aug. 28, 1917 |
| 1,885,321 | Benn | Nov. 1, 1932 |
| 2,076,918 | Robison | Apr. 13, 1937 |
| 2,245,847 | Bagby | June 17, 1941 |
| 2,548,249 | Woolsey | Apr. 10, 1951 |
| 2,602,678 | Mahoff et al. | July 8, 1952 |
| 2,627,580 | Picard | Feb. 3, 1953 |
| 2,646,294 | Anderson | July 21, 1953 |
| 2,754,139 | Frushour | July 10, 1956 |

FOREIGN PATENTS

| | | |
|---|---|---|
| 511,690 | Belgium | June 14, 1952 |

UNITED STATES PATENT OFFICE
CERTIFICATE OF CORRECTION

Patent No. 2,879,084                                                March 24, 1959

Kurt Staiger

It is hereby certified that error appears in the printed specification of the above numbered patent requiring correction and that the said Letters Patent should read as corrected below.

Column 8, line 47, for "regular" read -- angular --.

Signed and sealed this 11th day of August 1959.

(SEAL)

Attest:

KARL H. AXLINE                                              ROBERT C. WATSON
Attesting Officer                                           Commissioner of Patents